US010332046B2

United States Patent
Yelisetty et al.

(10) Patent No.: US 10,332,046 B2
(45) Date of Patent: Jun. 25, 2019

(54) SOCIAL WORKFLOW ENGINE

(71) Applicant: Accenture Global Services Limited, Dublin (IE)

(72) Inventors: Srinivas Yelisetty, Fremont, CA (US); Alex Kass, Palo Alto, CA (US); Brett Goldstein, San Francisco, CA (US); Masoud Loghmani, San Mateo, CA (US); Gurdeep Singh, Karnataka (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 713 days.

(21) Appl. No.: 14/313,231

(22) Filed: Jun. 24, 2014

(65) Prior Publication Data
US 2014/0379415 A1    Dec. 25, 2014

Related U.S. Application Data

(60) Provisional application No. 61/838,420, filed on Jun. 24, 2013.

(51) Int. Cl.
*G06Q 10/06* (2012.01)
*G06Q 50/00* (2012.01)

(52) U.S. Cl.
CPC ....... *G06Q 10/06311* (2013.01); *G06Q 10/06* (2013.01); *G06Q 10/0631* (2013.01); *G06Q 10/06316* (2013.01); *G06Q 10/063114* (2013.01); *G06Q 50/01* (2013.01)

(58) Field of Classification Search
CPC ....... G06Q 10/06311; G06Q 10/06316; G06Q 10/0631; G06Q 10/06; G06Q 10/063114; G06Q 50/01

USPC ................... 705/7.13, 7.12, 7.26, 7.15, 319
See application file for complete search history.

(56) References Cited

U.S. PATENT DOCUMENTS

| | | | |
|---|---|---|---|
| 6,507,845 B1 | 1/2003 | Cohen et al. | |
| 7,047,159 B2 | 5/2006 | Muehl et al. | |
| 8,300,922 B1 | 10/2012 | Garvey | |
| 9,177,267 B2 | 11/2015 | Kass et al. | |
| 9,560,091 B2 | 1/2017 | Kass et al. | |

(Continued)

OTHER PUBLICATIONS

I-Sector Introduces Work Flow Manager Application for Cisco Telephony, FinancialWire (Jul. 2010) (Year: 2010).*

(Continued)

*Primary Examiner* — Charles Guiliano
(74) *Attorney, Agent, or Firm* — Brinks Gilson & Lione

(57) ABSTRACT

A social collaboration workflow system embeds social collaboration functionality into the workflow process. The system identifies a location of a user device, and identifying a current activity associated with the user device based on the identified location. The system displays instructions for performing the current activity to a user interface on the user device, and displays an activity feed comprising a set of previously submitted activity feed posts that are related to the current activity to the user interface. The system determines whether the current activity has changed to a new current activity. If the current activity has changed, the system displays instructions for performing the new current activity to the user interface, and displays a new set of previously submitted activity feed posts that are related to the new current activity to the user interface.

16 Claims, 9 Drawing Sheets

(56) References Cited

U.S. PATENT DOCUMENTS

| | | | | |
|---|---|---|---|---|
| 2001/0032103 | A1* | 10/2001 | Sinex | G06Q 10/025 |
| | | | | 705/4 |
| 2008/0177726 | A1 | 7/2008 | Forbes et al. | |
| 2010/0332280 | A1 | 12/2010 | Bradley et al. | |
| 2011/0313803 | A1* | 12/2011 | Friend | G06Q 10/06311 |
| | | | | 705/7.13 |
| 2013/0071029 | A1 | 3/2013 | Terwilliger et al. | |
| 2013/0103447 | A1* | 4/2013 | Melander | G06Q 50/01 |
| | | | | 705/7.15 |
| 2014/0297743 | A1* | 10/2014 | Zyto | H04L 67/10 |
| | | | | 709/204 |

OTHER PUBLICATIONS

Namiot, D. et al., "Context-aware data discovery" 16$^{th}$ International Conference on Intelligence in Next Generation Networks (ICIN), 2012 pp. 134-141.

Australian Patent Examination Report No. 1. Patent Application No. 2014203425, Aug. 8, 2014.

* cited by examiner

SOCIAL WORKFLOW ENGINE

PRIORITY CLAIM

This application claims priority to U.S. Provisional Patent Application No. 61/838,420, filed Jun. 24, 2013, which is incorporated herein by reference.

TECHNICAL FIELD

This application relates to electronic collaboration tools and applications. In particular, this application relates to embedding collaborative social networking components into electronic client applications.

BACKGROUND

Existing business process engines do not provide built in features that allow specifying social context for each element of a workflow definition. Integration of business applications with social platforms typically requires additional development effort for each business process and requires expertise in the social platform of choice.

Presently, organizations typically deploy process management and workflow tools to manage a process without systematic integration in the social collaboration network that support collaborative interaction within the broader set of activities engaged in by the organization's workforce. Current workflow tools typically come either without a social collaboration component, or with a special purpose collaboration tool that is closely wedded to the associated process tool. This usually results in a fractured user experience.

In addition, business process workflows are designed using standard workflow tools without integration with social collaboration platforms. Integration with social platforms is typically added on separately, and as an enhancement. As a result, workflow participants usually have to explicitly switch between existing business process tools (where the workflow activity is implemented) and collaboration tools (where work is socialized/shared/collaborated upon) to socialize and collaborate around the activity. As a result, the user adoption of social collaboration solution within an Enterprise suffers and may even result is eventual failure. A need therefore exists for a business process that embeds social collaboration features into existing business process workflows.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
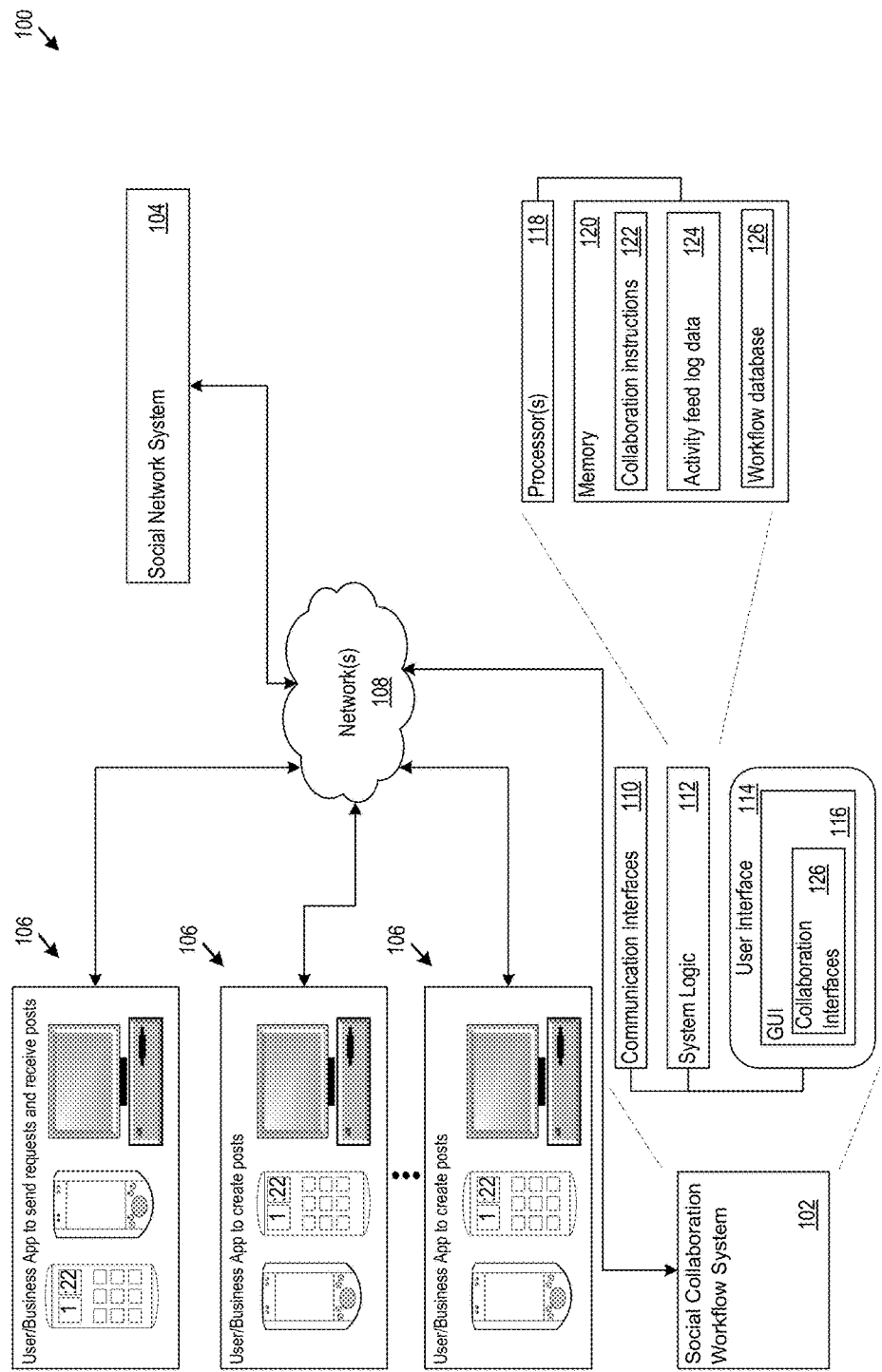
FIG. 1 shows an example of a social workflow architecture for facilitating contextual-based collaboration using a social network platform and for integrating feedback received through the social network platform into a business workflow.

FIG. 1 shows an example of a social workflow architecture 100 ("architecture 100") for facilitating contextual-based collaboration using a social network platform and for integrating feedback received through the social network platform into a business workflow. The architecture includes a dynamic social collaboration workflow system 102, a social network system 104, and user portals 106, each of which is configured to communicate over any number or variety of communications network(s) 108. The user portals 106 may correspond to members of a project team, collaboration group or experts using client applications, or other computer software applications, to perform activities associate with a stage of a workflow. A workflow may correspond to a predefined sequence of processes or stages for accomplishing a particular task. For example, a workflow may define stages for repairing or performing maintenance on a particular piece of equipment at a plant. Each stage of the workflow may further include one or more steps to be performed.

The user portals 106 may take many different forms. As examples, the user portals 106 may be smart phones, laptop computers, personal data assistants, pocket computers, tablet computers, portable email devices, or processes executed in memory by a processor. The user portals 106 may be found in virtually any context, including the home, business, public spaces, or automobile. The user portals 106 may execute a software application to provide the collaboration functionality. The application executed by the user portals 106 may be augmented via software plugins that integrate collaboration functionality of the social network platform 104 into the client application. In particular, the application may include an activity feed through which a filtered set of status updates of other users may be populated to a particular user's user portal 106. The status updates may be filtered based on a variety of factors, including the location of the user, which stage of the workflow the user is performing, etc.

The system 102 facilitates status updates provided to the social networking system 104 though a user portal 106. The status updates may be, for example, automatically generated. For example, when a user begins a new stage of the workflow, the system 102 may automatically generate a status update indicating as much to other members of the user's team. The status updates may also be manually provided by the user when the user types a status update into the activity feed provided through the client application installed on the user portal 106. The system 102 may determine the context of the user's status update and augment the status update with contextual information. For example, if the system 102 has determined that the user is working on a particular piece of equipment, the system 102 may add keywords or phrases to the user's status update that identify the present stage of the workflow. In other words, the status update seen by other members of the team may include additional key terms that were not present in the user's original status update.

The dynamic workflow system 102 may include communication interfaces 110 that connect the dynamic workflow system 102 to the networks 108, system logic 112, and a user interface 114. The user interface 114 may display a graphical user interface 116. The user interface 114 facilitates setup, configuration, and monitoring of the dynamic workflow system 102.

The system logic 112 implements in hardware, software, or both, any of the processing, user interfaces, reports, and other aspects of the system shown or described below or in the Figures. As one example, the system logic 112 may include one or more processors 118 and program and data memories 120. The program and data memories 120 hold, for example, collaboration instructions 122. The data and program memories 120 may also hold collaboration configuration parameters 124 that guide the operation of the collaboration system 102, as well as a workflow database 126 that includes information about workflows, including description information about different stages of a workflow process, and different steps of each stage. The workflow database 126 may also include activity feed log data that stores past posts made by a user to the workflow activity feed on the user's device.

The processors 118 execute the collaboration instructions 122, and the configuration parameters 124 may inform the processors 118 as to how to handle the specific aspects of the collaboration processing described below and shown in the drawings. As a result, the processors 118 and collaboration instructions 122 implement the collaboration techniques described below and shown in the Figures. The system 102 may accept input from the user interface 114 to change, view, add, or delete any of the configuration parameters 124 at any time.

The social networking system 104 may be Jive®, Tibbr®, Moxie®, Chatter®, Yammer®, Newsgator® or other social network/micro-blogging systems. The social networking system 104 generates updates based on the received event information and pushes the updates back to the dynamic workflow system 102. When the dynamic workflow system 102 receives updates, it populates collaboration interfaces 126. While the collaboration interfaces 126 may appear on the GUI 116, the dynamic workflow system 102 may also push the collaboration interfaces 126 (or updates thereto) to the user portals 106 over the networks 108. The dynamic workflow system 102 may populate multiple collaboration interfaces, each corresponding to a different user or user portal 106. For example, if an expert or other user completes a task or edits a document, the dynamic workflow system 102 may send updates to the collaboration interfaces of other users that are part of the user's project team or collaboration group.

The dynamic workflow system 102 may communicate with social networking system 104 through a communications network 108. The communications network 108 may be any private or public communications network or combination of networks. The communications network 108 connects devices, such as the user portals 106, servers, systems, databases, or other network enabled devices, to other such devices, and thereby supports data communication between the connected devices. The communications network 108 may generally be enabled to employ any form of computer-readable media for communicating information from one computing device to another. The communications network 108 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 108 may execute any communication method by which information may travel between computing devices.

The user portals 106 may access the dynamic workflow system 102 via the communications network 110, for example, using a browser application. A browser based implementation allows system features to be accessible regardless of the underlying platform of the user portals 106. For example, the user portals 106 may each be a desktop, laptop, handheld computer, cell phone, mobile messaging device, network enabled television, digital video recorder, automobile, or other network enabled user portal, which may use a variety of hardware and/or software packages. The user portals 106 may also connect to the dynamic workflow system 102 and social network system 104 using a stand-alone application which may be platform-dependent or platform-independent.

The dynamic workflow system 102 may be implemented in many different ways. For example, although some features may be shown or described as stored in computer-readable memories (e.g., as logic implemented as computer-executable instructions or as data structures in memory), all or part of the dynamic workflow system 102 and its logic and data structures may be stored on, distributed across, or read from other machine-readable media. The media may include hard disks, floppy disks, CD-ROMs, a signal, such as a signal received from a network or received over multiple packets communicated across the network.

The dynamic workflow system 102 may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the dynamic workflow system 102 may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that performs the collaboration processing described in this document and shown in the Figures.

The dynamic workflow system 102 disclosed herein more efficiently gathers the best thinking applied to projects and problems from anywhere within the group or enterprise, thus reducing or eliminating latent capacity and under-leveraged expertise within most organizations, as well as reducing computing resources required to provide solutions to problems that have already been addressed or answered by others within the group or enterprise.

Figure 2:
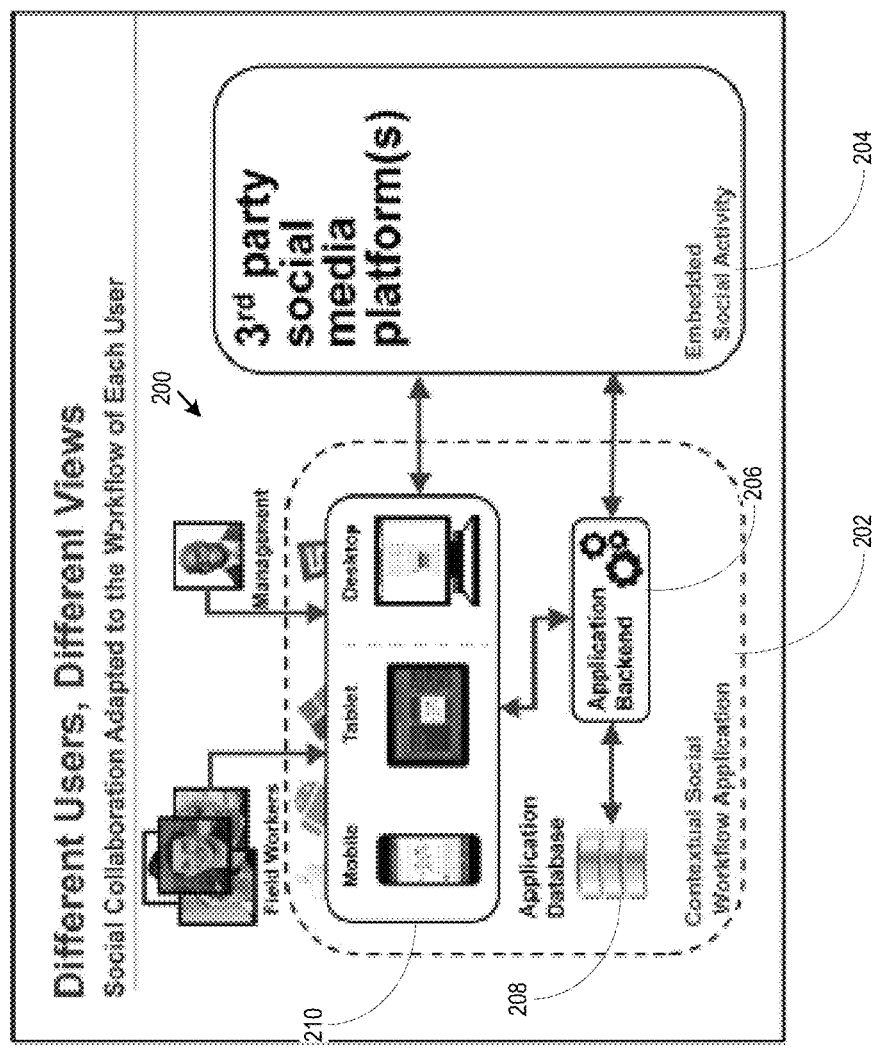
FIG. 2 shows another example of an architecture that facilitates dynamic social collaboration between multiple team members.

FIG. 2 shows another example of an architecture 200 that facilitates dynamic social collaboration between multiple team members. The architecture 200 includes a contextual social workflow application 202 in communication with social networking platform(s) 204. The social networking platform(s) 204 may be the social networking system described above, such as Jive®, Tibbr®, Moxie®, Chatter®, Yammer®, Newsgator® and/or other social network/micro-blogging systems. The application 202 includes a backend program portion 206 that communicates with the social networking platform(s) 204 and with an application database 208, such as a workflow database discussed herein. The application 202 may be installed on different devices 210, such as the devices described above with respect to the user portals. Users interact with a front-end portion of the application 202 via their respective devices 210. As will be described herein, the application 202 is configured to provide different views, or interfaces, for different users based on the workflow process in which each different user is engaged. The enterprise social network functionality embedded into the application 202 allows for real-time collaboration between the different users. Further, based on contextual information collected and analyzed about each user, the application filters the activity feeds provided through the social networking system(s) 204, such that each activity feed on each of the user's devices 210 may be populated with a different set of activity feed posts. As such, the enterprise social network feed to be used in the workflow process may be available by a selection from activity feeds. Further, the enterprise social network feed may simply refer to the activity feed provided through the social network system.

In addition, while FIG. 1 shows a system 102 in communication with the user portals through a communications network, in one embodiment all or part of the functionality of the system 102 may be performed by the processor and memory of the devices 210. In another embodiment, the backend program portion 206 may run on a server remote from the devices 210. The application database 208 may similarly be stored on a server remote from the devices 210.

Figure 3:
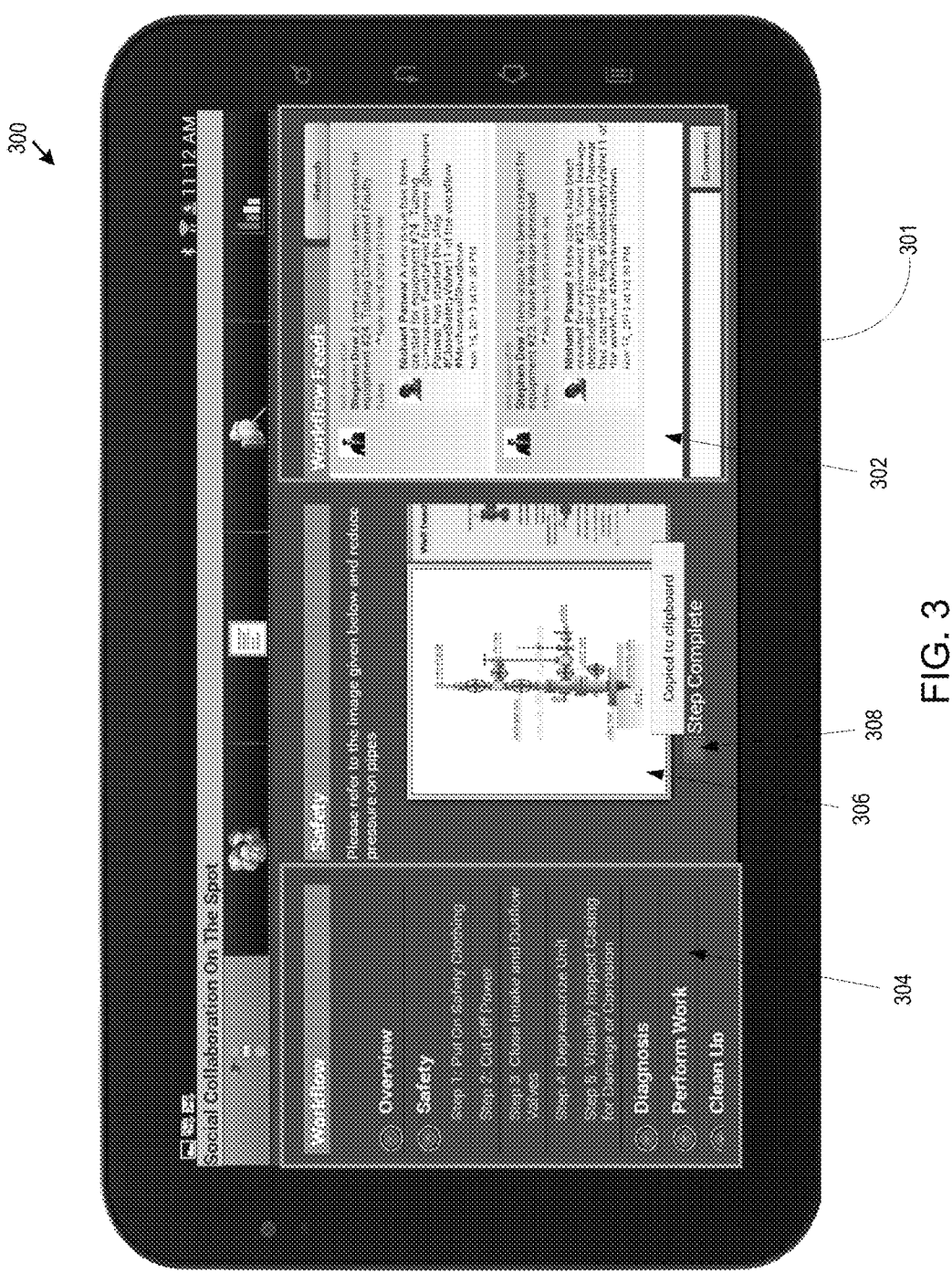
FIG. 3 shows a social collaboration workflow application interface and a workflow collaboration application installed on a mobile device such as a smartphone or tablet.

FIG. 3 shows a social collaboration workflow application interface 300 and a workflow collaboration application installed on a mobile device 301 such as a smartphone or tablet. It will be understood that the interface may also be a webpage accessible via the internet. The application interface 300 includes a workflow feeds section 302, and workflow overview section 304, and a stage/step description section 306. The workflow overview section 304 provides the steps of the workflow process a user is engaged in. For the sake of explanation, the user is referred to as a field engineer working on a piece of equipment at an oil field. However, it will be understood that the application may be used to aid users performing workflows in other business or industrial settings. When field engineer initiates the application, the system 102 determines which workflow the engineer is engaged in and displays information related to that workflow to the workflow overview section. The system 102 may determine which workflow the engineer is engaged in based on a manual input by the engineer, or may automatically determine in which workflow the engineer is engaged based on the engineer's location, calendar entries, or other factors. For example, the based on the engineer's location, the system 102 may determine that the engineer is working on a particular component known to be at the engineer's location. The system 102 may then identify the workflow corresponding to maintenance/repair of that component.

Once the system 102 identifies the workflow, the system 102 transmits workflow data to the workflow application running on the engineer's device. The workflow application, under control by the processor of the engineer's mobile device, then populates the workflow overview information to the workflow overview section 304 and stage/step description data to the stage/step description section 306. The workflow overview information may include an identification of the workflow and an outline of the stages and steps of the workflow process. In FIG. 3, the stages of the workflow include "Overview," "Safety", "Diagnosis", "Perform Work," and "Clean Up." FIG. 3 also shows that the "Safety" stage includes five steps. Each stage may include one or more steps.

The stage/step description data may include information related to a particular stage of the workflow process, as well as a particular step of the stage, such as diagrams of the component that is the subject of the workflow process, instructions for performing the step, and best practices submitted by other team members that have previously performed the step. The stage/step description section 306 also includes a button 308 that the engineer may select when he/she has completed a particular step. When the engineer has indicated that he/she has completed a step, the application may automatically look up in the workflow database the stage/step description data corresponding to the subsequent stage/step in the workflow process and provide that data to the application. In other words, when the engineer indicates that he/she has completed a step, the stage/step description section 306 will automatically change to show stage/step description data corresponding to the next stage/step in the workflow process.

Through the workflow feeds section 302 the engineer may post comments, and view comments posted by others. The comments posted by the engineer and others are filtered for each user. In other words, if one user posts a comment to his or her workflow feed, that comment may be sent to less than all of the user's team members. The criteria the system 102 may use to filter user comments may include in which step or stage of the workflow process the user is engaged. For example, referring to FIG. 3, if a user working on step 3 of the "Safety" stage of the workflow process, posts a comment related to step 3, the system 102 may only populate that comment to the workflow feeds on the devices of other users presently performing step 3 of the "Safety" stage, or only to the workflow feeds for users engaged in any of the steps of the "Safety" stage. As another example, the system 102 may filter comments based on location data. In other words, the system 102 may populate comments of a user to the workflow feeds of other users that are within a certain proximity from each other, e.g., at the same location, within a certain number of miles, etc. The system 102 determines for each other user whether that comment should be populated to the workflow feed of the user's mobile device. The filters applied to each user are dynamically changing because the users move to different locations, and may be moving from one step to another or from one stage to another. In other words, a comment from one user may be filtered at one time, but passed through to a second user's workflow feed at another time based on changing circumstances of one or both of the users.

The system 102 also stores comments made by the users of the application. The system 102 not only filters comments made by users as those comments are made, but filters past comments to identify relevant past comments that should be populated to the user's workflow feed. For example, if a first engineer working on step 4 of the "Safety" stage submits a comment on the instructions associated with that step, the system 102 may determine that this comment is not relevant to a second engineer that is working on step 1 of the "Safety"

stage and not populate the comment of the first engineer to the workflow feed on the device being used by the second engineer. However, at a later time when the second engineer reaches step 4 of the "Safety" stage, the system 102 may determine that the past comment by the first engineer is now relevant and populate that past comment to the workflow feed corresponding to the second engineer. In this manner, as the engineer proceeds from one step of a stage to another, or from one stage of the workflow to another, the set of comments in the workflow feed section 302 is dynamically changing based on what the engineer is working on, where the engineer is, as well as on other contextual information.

The system 102 also automatically augments comments made by engineers with additional information before those comments are populated to the workflow feeds of other engineers. For example, because the system 102 knows in which stage and step of the workflow the engineer is engaged, the system 102 may insert keywords into comments made by the engineers. For example, FIG. 3 shows a comment 310 that includes "#24", which corresponds to a particular piece of equipment, and which is a term not present in the original comment posted by the engineer, but was inserted by the system 102 before the comment is sent to the social networking platform for population to the workflow feeds on the devices of other engineers. The system 102 may use the inserted keywords in filtering comments. They keywords may also allow users to more easily search for relevant comments.

Figure 4:
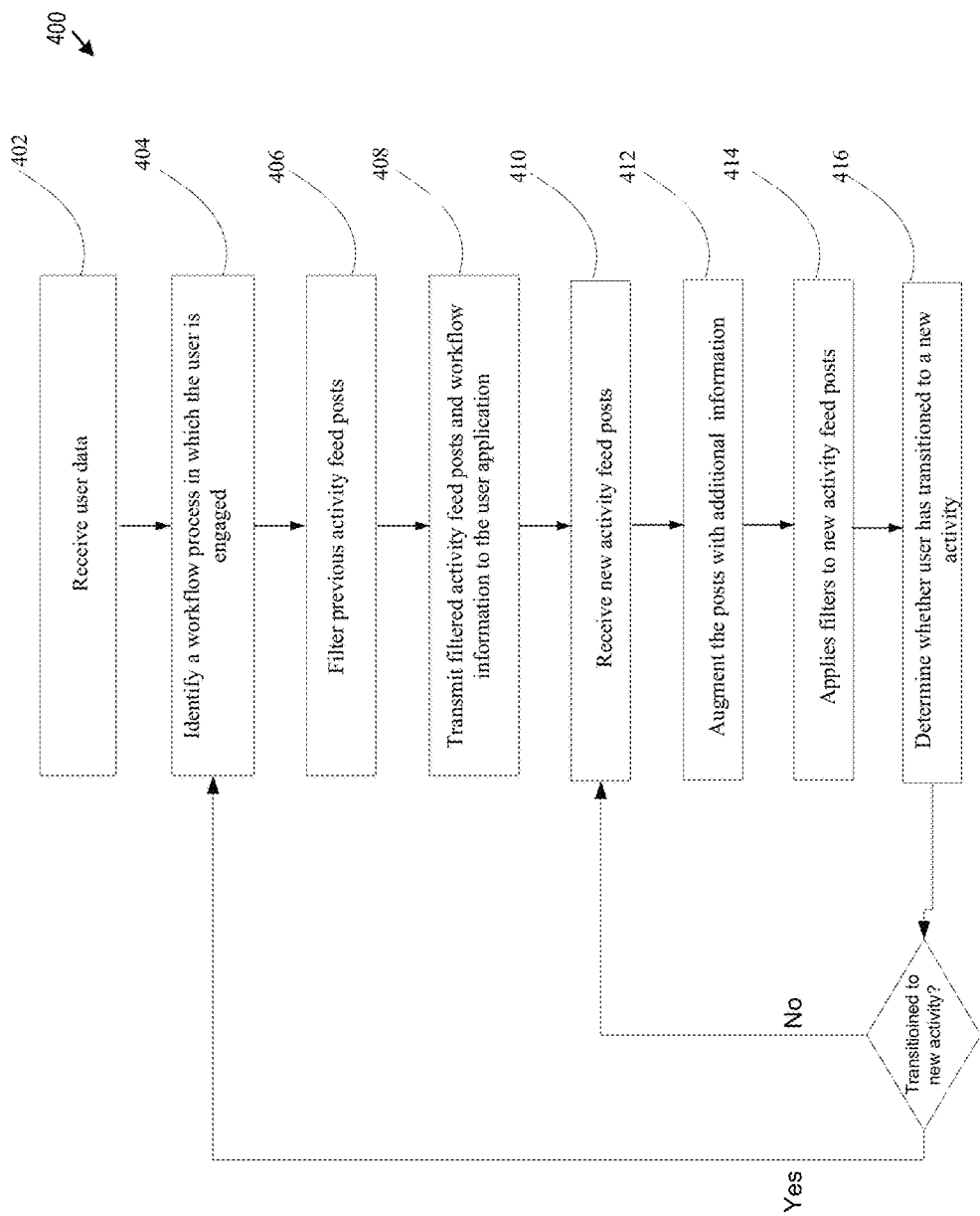
FIG. 4 shows an example of a collaboration workflow process executed by a social collaboration workflow system.

FIG. 4 shows an example of a collaboration workflow process 400 executed by a collaboration workflow system, such as the system 102 shown in FIG. 1. The system 102 receives user data (402) associated with a user of a collaboration workflow application installed on a user device, such as a user portal described above with respect to FIG. 1. The user data may be manually input by the user. For example, the user may input which workflow process, and which stage/step of a workflow process, he or she is engaged in. The user may also input his or her location, which equipment he or she is working on, or other information. The user data may also be location data identifying a location of the user. The location data may be obtained via a global positioning system (GPS) installed on the user device, via an IP address of the user device, using triangulation where the user device is a mobile phone, or other location determining techniques. The user may also scan barcodes or QR codes at a particular location using his or her device. The location data may be determined based on which code the user has scanned. The location may also be determined using near-field communication or Bluetooth protocols between the user's device, where the user's device pairs or otherwise establishes communication with another similarly equipped device at the location.

The user device described above may be any device that can be a user interface to accept user input and display the output of the workflow process. For example, the user device may be a portable device such as a tablet or a mobile terminal. Or as an alternatively, the user device may be a PC or any other general device or customized equipment. There may be multiple user devices. For example, one user device may be used to identify the issue in the present disclosed system and a second user device may be used to display the result such as selected activity feed to the users.

Based on the user data, the system 102 identifies a workflow process the user is engaged in (404). The system 102 may query a workflow database that includes information about a plurality of different workflow process. Each workflow process may have associated with it an identification of the stages of the workflow process, and of the steps with in each stage. The workflow database may include the stage/step description data discussed above.

The system 102 filters previously submitted activity feed posts made by members of the user's team (406). The workflow database may also include log data corresponding to the previously submitted posts. The system 102 filters the log data to identify previous posts that are relevant to the workflow process, stage, and/or step identified in Step 404. For example, a prior activity feed post submitted by a team member during the past week may be relevant to the stage of the workflow process the user is current engaged in. The system 102 identifies such activity feed posts, which will be displayed to the user's activity feed, such as the workflow feed shown in FIG. 3. The log data may be filtered, as an example, using keywords associated with the workflow process, stage and/or step in which the user is engaged. For example, if the workflow process relates to the maintenance of a particular piece of equipment, the system 102 may search the log data for posts that mention that equipment. As another example, the system 102 may search the log data for posts made at the same location as the user's present location.

The system 102 transmits the filtered activity feed posts, as well as information about the workflow process, stage of the workflow process, and/or steps of the stage to the workflow collaboration application running on the user's device (408). The application displays information related to the current workflow process, stages and step on the user's device, as illustrated in FIG. 3.

The system 102 also receives new activity feed posts entered by the user in an activity feed (410) of the workflow collaboration application, such as the workflow feed section shown in FIG. 3. The system 102 augments the posts with additional information relevant to the activity of the user (412). Based on the identification of the current workflow process, stage and/or step in which the user is engaged, the system 102 may query the workflow database to determine relevant keywords or terms and insert those keywords or terms into the post.

The system 102 applies filters to the post to determine which other members of the user's team should see the user's post, and when (414). For example, the system 102 may determine that the post should be viewed only by other team members engaged in the same stage of the same workflow process, or in the same step of the same stage. As another example, the system 102 may determine that the post should be viewed only by other team members located at the same location as the user. As a further example, the system 102 may determine that the post should be viewed only buy other team members engaged in a preceding or subsequent step of the same stage. In this example, and referring to FIG. 3 which shows the "Safety" stage having five steps, the system 102 may determine that posts by a user engaged in step 3 should be viewed by other team members engaged in steps 2, 3 or 4 of the same stage. The foregoing examples are exemplary; it will be understood that other filters may be applied to the posts to determine which team members should see which posts.

The system 102 determines whether the user has transitioned to a new step of the current stage, to a new stage of the current workflow process, or to a new workflow process (416). The system 102 may receive user input indicating that a step is complete, such as if the user selects the step completion button 308 shown in FIG. 3. The system 102 may also track the user's location using one or more of the location determination techniques described previously and, based on the location, determine whether the user is engaged in a new step, stage or workflow process. While FIG. 4 shows the determination of whether the user has transitioned to a new activity at the end of the process, the determination of step 416 may be performed at any point during the process 400. If the user has transitioned to a new workflow process, stage or step, the system 102 filters previously submitted posts (406) to identify a new set of past posts relevant to the new activity, and proceeds through steps 404, 406, 408, 410, 412, 414, 416 as described above for the new identified workflow process, stage or step. In this manner, if the user transitions to a new activity, the workflow collaboration application will display a new set of posts to the user's activity feeds that are relevant to the user's current activity. If the user is still engaged in the same activity (as used herein, "activity" refers to the workflow process, stage, or step), the system 102 continues to perform steps 410, 412, 414, 416 as described above until the user logs out of or otherwise turns off the workflow collaboration application, or until the user transitions to a new activity.

Figure 5:
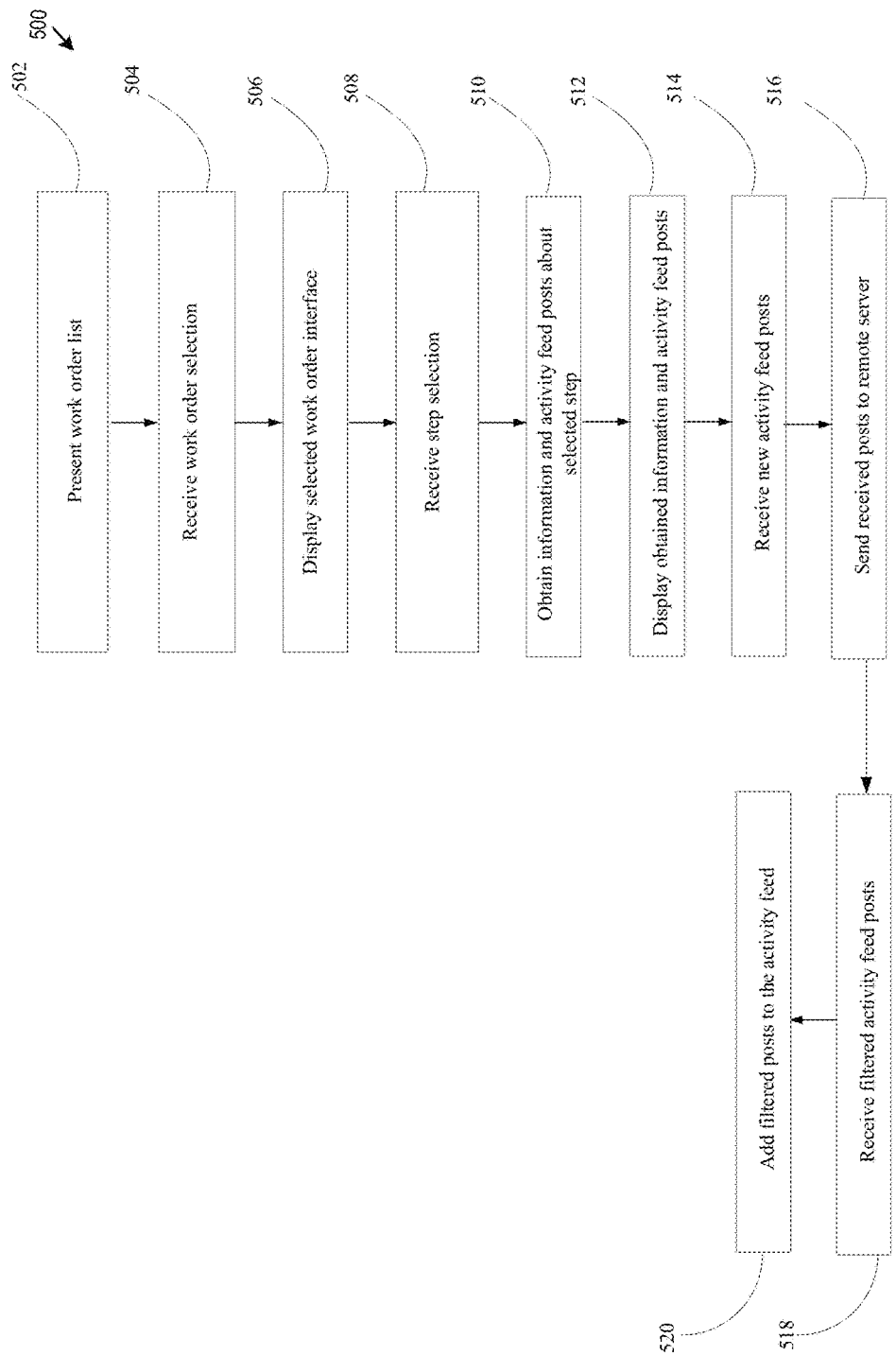
FIG. 5 shows another example of a process that may be performed by a social collaboration workflow application installed on a user's device.
Figure 6:
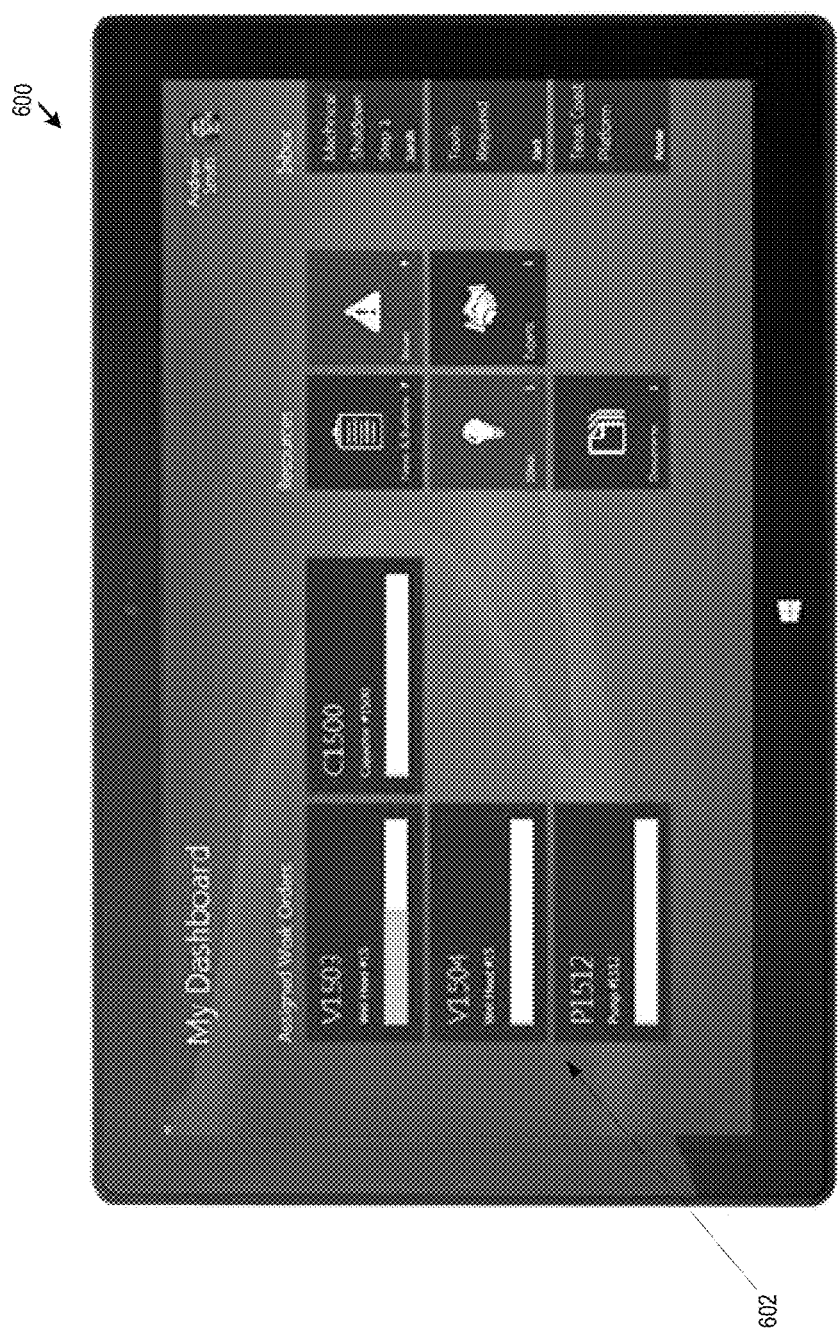
FIG. 6 shows a work order interface of a business application with embedded social collaboration.

FIG. 5 shows another example of a process 500 that may be performed by a social collaboration workflow application installed on a user's device. After a user logs into the application, the application presents a work order list to the user (502). FIG. 6 shows an interface 600 through which the application may present a work order list 602 to the user. The work order list 602 may include work orders assigned to the user by a manager. As noted above, for the sake of explanation the application is discussed in the context of an engineer working on a piece of equipment at an oil field. However, it will be understood that the application may be used to aid users performing workflows in other business or industrial settings.

Figure 7:
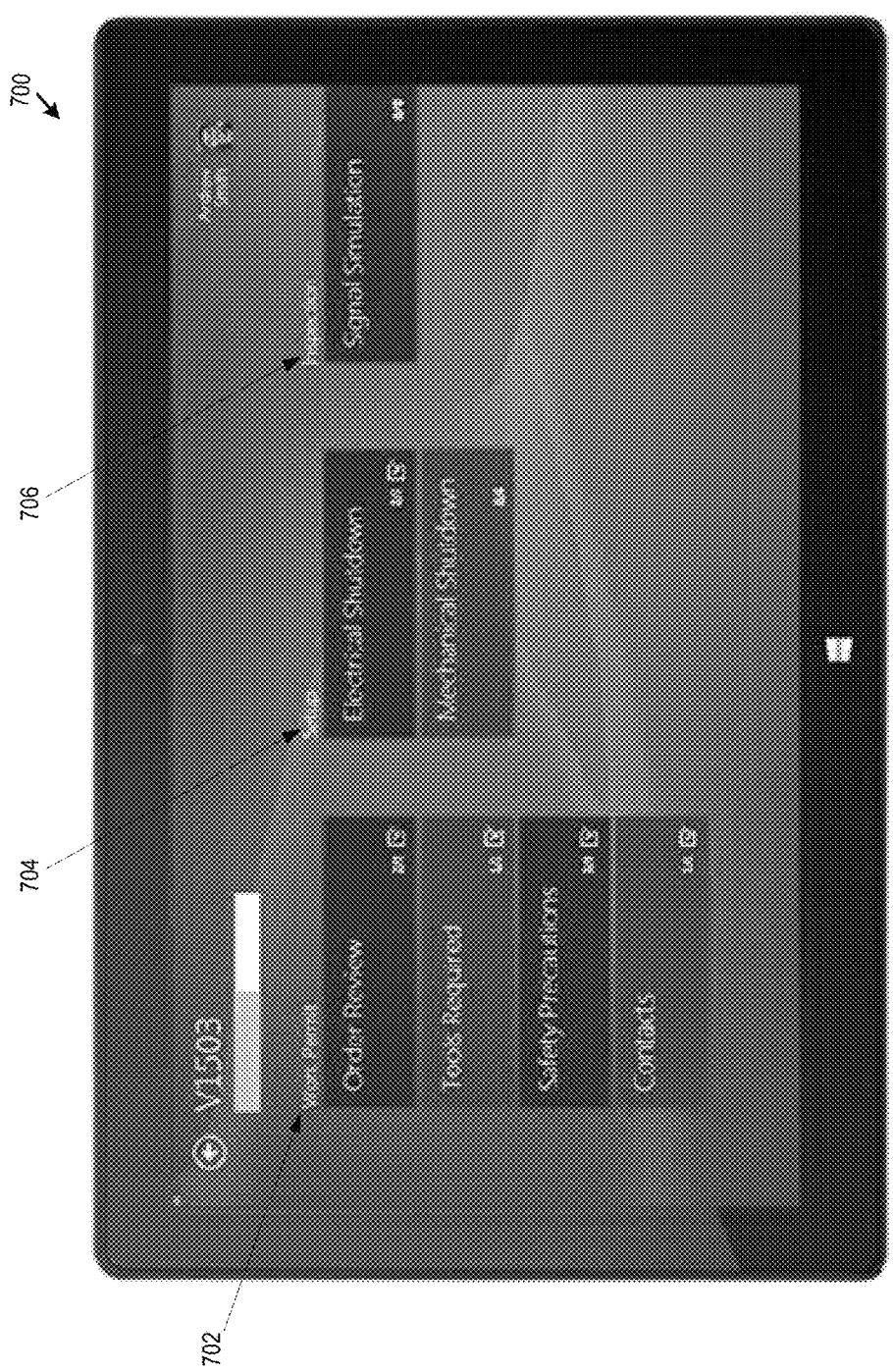
FIG. 7 shows a selected work order interface of the business application with embedded social collaboration.

The application receives a work order selection from the user (504), such as when the user selects one of the work orders in the work order list 602. The application then displays a selected work order interface that provides information about the selected work order (506). FIG. 7 shows a selected work order interface 700. The interface 700 shows the stages 702, 704, 706 of the work order, or workflow process. The interface 700 also displays the steps for performing each stage 702, 704, 706 of the workflow process.

The application receives a step selection input from the user (508), whereby the user selects one of the steps to be performed. The application then obtains detailed information about the selected step, as well as activity feed posts filtered based on the selected step (510). The application may query a workflow database for the information about the selected step. The workflow database may be a remote database, or may be stored in the memory of the user's device.

Figure 8:
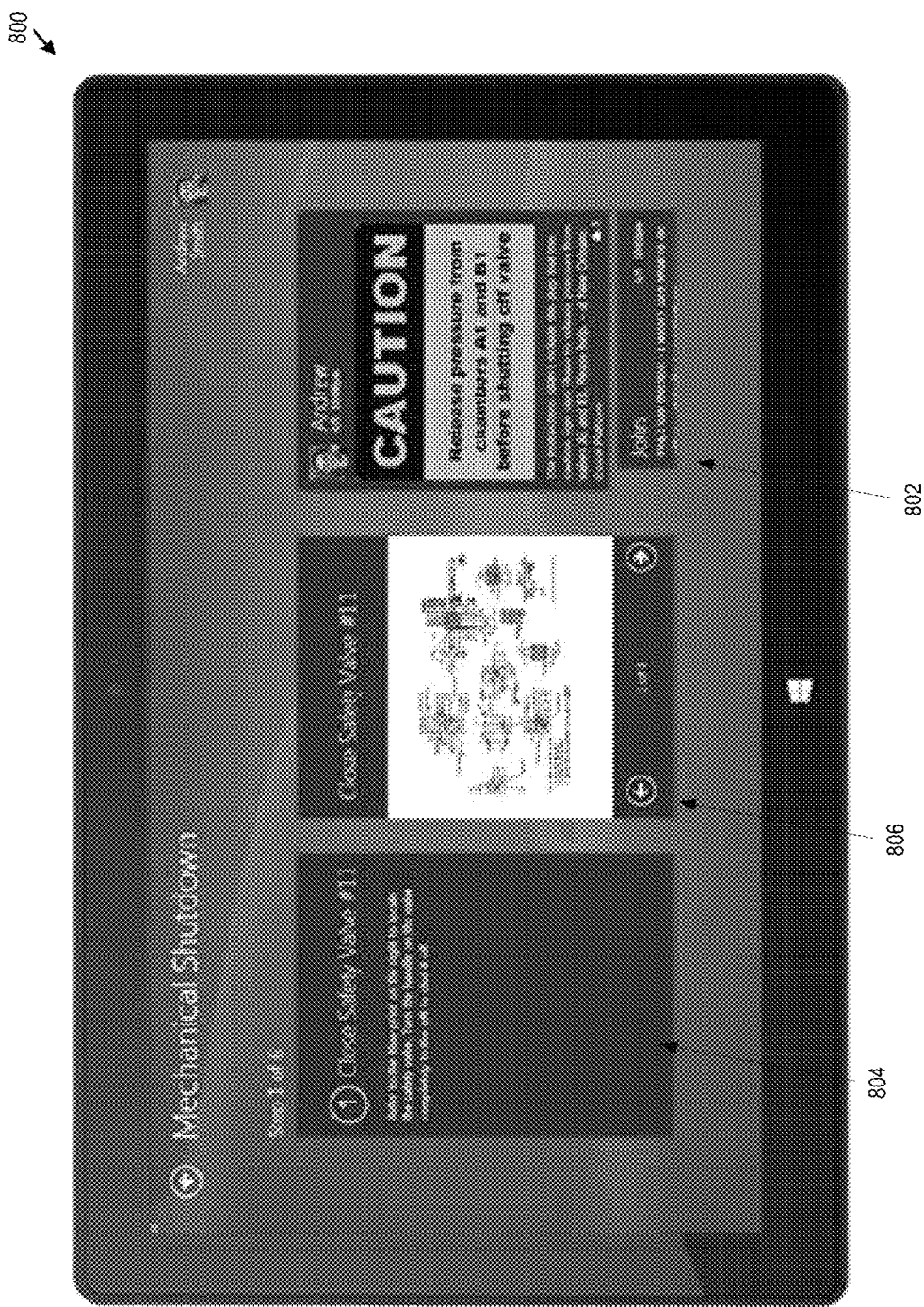
FIG. 8 shows an interface corresponding to the Mechanical Shutdown selection shown in FIG. 7.

The application displays the detailed information and filtered activity feed posts corresponding to the selected step (512). FIG. 8 shows an interface 800 corresponding to the Mechanical Shutdown selection shown in FIG. 7. Similar to the interface 300 shown in FIG. 3, the interface 800 includes a stage/step description data in a stage/step description section 806. In FIG. 8 the stage/step description data includes a diagram corresponding to step 1 of the selected step. The interface 800 also includes a workflow feed section 802 and a stage/step overview section 804.

The application receives one or more posts submitted by the user in the workflow feed section 804 (514). The application sends received posts to a remote server (516) that augments the posts with additional information and then filters the posts received from the user, as well as from other users, to determine which posts should be sent to which users. The application receives filtered posts from the remote server (518), and populates the workflow feed with the filtered posts (520). When the user completes the steps of the stage of the workflow process, the application may automatically transition to the next stage of the process, or may return the user to the work order list interface 600.

Figure 9:
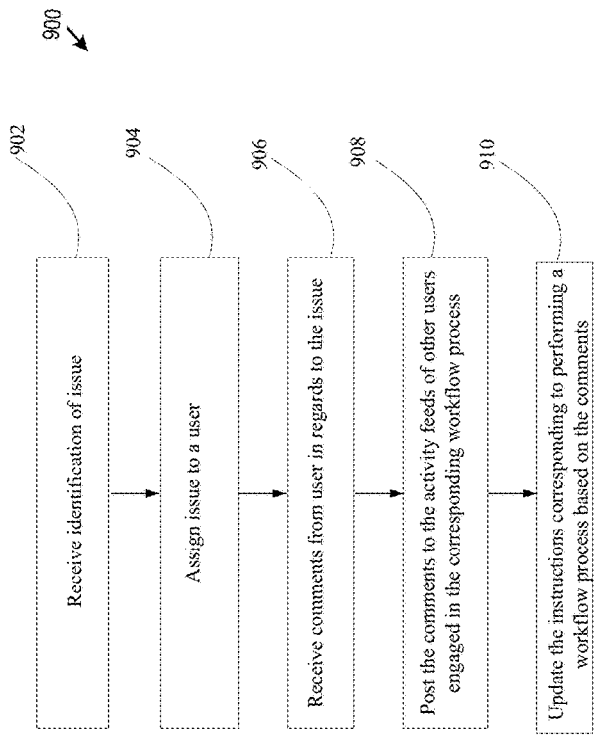
FIG. 9 shows another exemplary process executed by the social collaboration workflow system.

FIG. 9 shows another exemplary process executed by the social collaboration workflow system. A first user, e.g., manager, identifies an issue raised by a second user at a particular location, or related to a particular workflow process (902). The first user assigns the issue to a third user (904). The system receives comment from the third user about the issue (906). The third user may provide the comments through the workflow feed provided in the application interface. When another user is engaged in the same workflow process, he/she will see the comments provided by the third user in his/her workflow feed (908). If yet another user comments on the issue, the further comments may also be populated to the workflow feeds of other users, as determined by the filtering process described herein. Some users may "Like" the comments provided by the third user about the issue. Users that "Liked" the comments, or "Liked" the issue, may see the subsequent comments made in regards to that issue. The first user may update the instructions for performing a stage of the workflow process (910), or a step within the stage, based on the comments such that the next time a user is engaged in that stage or step, the stage/step description information displayed to the user interface will incorporate the user submitted comments.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system, comprising:
   a social collaboration workflow system communicatively coupled to a plurality of user devices via a network and communicatively coupled to a social network system via the network;
   the social collaboration workflow system comprising:
   a processor; and
   a memory in communication with the processor, the memory comprising:
   a workflow database comprising workflow overview information, stage/step description data, an activity feed post log comprising previously submitted activity feed posts received from users via the social network system, and collaboration instructions that, when executed, cause the processor to:
   identify a first real-time location of a first user device based on a location data obtained by a first location identification system associated with the first user device, wherein the first location identification system is selected from the group consisting of a global positioning system, an IP address of the first user device, barcodes or QR codes scanned by the first user device, and near-field communication or Bluetooth protocols between the first user device and a nearby device;
   identify a first workflow and a first stage/step associated with the first user device based on the identified first real-time location;

display first workflow overview information to a workflow overview section of a user interface on the first user device via the network;
display first stage/step description data to a stage/step description section of the user interface on the first user device via the network, wherein the stage/step description section of the user interface comprises a step completion button that a user can select when a particular step is completed;
filter a first set of the previously submitted activity feed posts in the activity feed post log in the workflow database based on the identified first workflow and first stage/step by using a first set of keywords associated with the first workflow and the first stage/step and based on the identified first real-time location of the first user device by searching the activity feed post log for activity feed posts made at the first real-time location of the first user device;
create and display a first activity feed to a workflow feed section of the user interface on the first user device via the network, wherein the first activity feed comprises the filtered first set of the previously submitted activity feed posts from the activity feed post log in the workflow database;
receive activity feed posts input from the first user device at the first real-time location, wherein the activity feed posts input is entered by the user in the workflow feed section of the user interface on the first user device;
determine a second set of keywords related to the activity feed posts input through querying the workflow database based on the first workflow, the first stage/step, and the first real-time location;
configure new activity feed posts by inserting additional information into the activity feed posts input through a server remote from the plurality of user devices, wherein the additional information comprises the determined second set of keywords related to the activity feed posts input;
determine other user devices of the plurality of user devices to which the configured new activity feed posts are to be sent by filtering the configured new activity feed posts based on a preset distance between the first real-time location and a real-time location of each of the other user devices of the plurality of user devices, wherein the real-time location of each of the other user devices is determined by a second location identification system associated with each of the other user devices, wherein the second location identification system is selected from the group consisting of a global positioning system, an IP address of each of the other user devices, barcodes or QR codes scanned by each of the other user devices, and near-field communication or Blue-tooth protocols between each of the other user devices and a nearby device;
transmit and display the filtered configured new activity feed posts to a current activity feed in a workflow feed section of a user interface of each of the determined other user devices of the plurality of user devices;
receive a selection of the step completion button by the user in the stage/step description section of the user interface on the first user device, thereby causing the social collaboration workflow system to receive information indicating that the first stage/step is completed from the first user device;
in response to receiving information indicating that the first stage/step is completed, automatically change content displayed in the stage/step description section and the workflow feed section of the user interface on the first user device by:
looking up in the workflow database next stage/step description data corresponding to a next stage/step to the first stage/step;
dynamically updating the stage/step description section of the user interface on the first user device via the network to display the next stage/step description data;
filtering a next set of the previously submitted activity feed posts in the activity feed post log in the workflow database based on the next stage/step by using a third set of keywords associated with the next stage/step;
creating and dynamically updating the workflow feed section of the user interface on the first user device via the network to display a next activity feed, wherein the next activity feed comprises the filtered next set of the previously submitted activity feed posts from the activity feed post log in the workflow database;
track a second real-time location of the first user device based on the location data obtained by the first location identification system associated with the first user device;
determine that the first workflow has changed to a new workflow based on the second real-time location of the first user device;
in response to determining the first workflow has changed to the new workflow, automatically change content displayed in the workflow overview section and the workflow feed section of the user interface on the first user device by:
looking up in the workflow database new workflow overview information corresponding to the new workflow;
dynamically updating the workflow overview section of the user interface on the first user device via the network to display the new workflow overview information;
filtering a first new set of the previously submitted activity feed posts in the activity feed post log in the workflow database based on the determined new workflow by using a fourth set of keywords associated with the new workflow and based on the second real-time location of the first user device by searching the activity feed post log for activity feed posts made at the second real-time location of the first user device; and
creating and dynamically updating the workflow feed section of the user interface on the first user device via the network to display a first new activity feed, wherein the first new activity feed comprises the filtered first new set of the previously submitted activity feed posts from the activity feed post log in the workflow database.

2. The system of claim 1, wherein the instructions, when executed, further cause the processor to:
determine that the first stage/step has changed to a new stage/step based on the second real-time location of the first user device;
in response to determining the first stage/step has changed to the new stage/step, automatically change content displayed in the stage/step description section and the workflow feed section of the user interface on the first user device by:
looking up in the workflow database new stage/step description data corresponding to the new stage/step;
dynamically updating the stage/step description section of the user interface on the first user device via the network to display the new stage/step description data;
filtering a second new set of the previously submitted activity feed posts in the activity feed post log in the workflow database based on the determined new stage/step by using a fifth set of keywords associated with the new stage/step and based on the second real-time location of the first user device by searching the activity feed post log for activity feed posts made at the second real-time location of the first user device; and
creating and dynamically updating the workflow feed section of the user interface on the first user device via the network to display a second new activity feed, wherein the second new activity feed comprises the filtered second new set of the previously submitted activity feed posts from the activity feed post log in the workflow database.

3. The system of claim 1, wherein configuring the new activity feed posts comprises embedding the determined second set of keywords related to the activity feed posts input into the activity feed posts input received from the first user device at the first real-time location, and filtering the configured new activity feed posts comprises filtering the configured new activity feed posts based on the determined second set of keywords related to the activity feed posts input.

4. The system of claim 1, wherein the instructions, when executed, further cause the processor to:
receive data, from a second user device, indicative of one or more issues arising at a stage/step amongst a plurality of stages/steps that are part of the first workflow;
transmit and post the received data to a current activity feed in a workflow feed section of a user interface on a third user device via the network;
receive feedback data from the third user device about the one or more issues; and
selectively incorporate the feedback data into stage/step description data corresponding to the stage/step amongst the plurality of stages/steps that are part of the first workflow.

5. The system of claim 1, wherein filtering the configured new activity feed posts comprises applying different filters to the configured new activity feed posts for each of the other user devices of the plurality of user devices.

6. A social collaboration method, comprising:
receiving, by a social collaboration workflow system, activity feed posts from a plurality of user devices via a social network system and storing the activity feed posts in an activity feed post log stored in a workflow database remote from the plurality of user devices, wherein the workflow database comprises workflow overview information and stage/step description data;
identifying a first real-time location of a first user device based on a location data obtained by a first location identification system associated with the first user device, wherein the first location identification system is selected from the group consisting of a global positioning system, an IP address of the first user device, barcodes or QR codes scanned by the first user device, and near-field communication or Blue-tooth protocols between the first user device and a nearby device;
identifying a first workflow and a first stage/step associated with the first user device based on the identified first real-time location;
displaying first workflow overview information to a workflow overview section of a user interface on the first user device via a network;
displaying first stage/step description data to a stage/step description section of the user interface on the first user device via the network, wherein the stage/step description section of the user interface comprises a step completion button that a user can select when a particular step is completed;
filtering a first set of the activity feed posts stored in the activity feed post log in the workflow database based on the identified first workflow and first stage/step by using a first set of keywords associated with the first workflow and the first stage/step and based on the identified first real-time location of the first user device by searching the activity feed post log for activity feed posts made at the first real-time location of the first user device;
creating and displaying a first activity feed to a workflow feed section of the user interface on the first user device via the network, wherein the first activity feed comprises the filtered first set of the activity feed posts from the activity feed post log in the workflow database;
receiving activity feed posts input from the first user device at the first real-time location, wherein the activity feed posts input is entered by the user in the workflow feed section of the user interface on the first user device;
determining a second set of keywords related to the activity feed posts input through querying the workflow database based on the first workflow, the first stage/step, and the first real-time location;
configuring new activity feed posts by inserting additional information into the activity feed posts input through a server remote from the plurality of user devices, wherein the additional information comprises the determined second set of keywords related to the activity feed posts input;
determining other user devices of the plurality of user devices to which the configured new activity feed posts are to be sent by filtering the configured new activity feed posts based on a preset distance between the first real-time location and a real-time location of each of the other user devices of the plurality of user devices, wherein the real-time location of each of the other user devices is determined by a second location identification system associated with each of the other user devices, wherein the second location identification system is selected from the group consisting of a global positioning system, an IP address of each of the other user devices, barcodes or QR codes scanned by each of the other user devices, and near-field communication or Blue-tooth protocols between each of the other user devices and a nearby device;

transmitting and displaying the filtered configured new activity feed posts to a current activity feed in a workflow feed section of a user interface of each of the determined other user devices of the plurality of user devices;

receiving a selection of the step completion button by the user in the stage/step description section of the user interface on the first user device, thereby receiving information indicating that the first stage/step is completed from the first user device;

in response to receiving information indicating that the first stage/step is completed, automatically changing content displayed in the stage/step description section and the workflow feed section of the user interface on the first user device by:

looking up in the workflow database next stage/step description data corresponding to a next stage/step to the first stage/step;

dynamically updating the stage/step description section of the user interface on the first user device via the network to display the next stage/step description data;

filtering a next set of the previously submitted activity feed posts in the activity feed post log in the workflow database based on the next stage/step by using a third set of keywords associated with the next stage/step;

creating and dynamically updating the workflow feed section of the user interface on the first user device via the network to display a next activity feed, wherein the next activity feed comprises the filtered next set of the previously submitted activity feed posts from the activity feed post log in the workflow database;

tracking a second real-time location of the first user device based on the location data obtained by the first location identification system associated with the first user device;

determining that the first workflow has changed to a new workflow based on the second real-time location of the first user device;

in response to determining the first workflow has changed to the new workflow, automatically changing content displayed in the workflow overview section and the workflow feed section of the user interface on the first user device by:

looking up in the workflow database new workflow overview information corresponding to the new workflow;

dynamically updating the workflow overview section of the user interface on the first user device via the network to display the new workflow overview information;

filtering a first new set of the activity feed posts stored in the activity feed post log in the workflow database based on the determined new workflow by using a fourth set of keywords associated with the new workflow and based on the second real-time location of the first user device by searching the activity feed post log for activity feed posts made at the second real-time location of the first user device; and creating and dynamically updating the workflow feed section of the user interface on the first user device via the network to display a first new activity feed, wherein the first new activity feed comprises the filtered first new set of the activity feed posts from the activity feed post log in the workflow database.

7. The method of claim 6, further comprising:

determining that the first stage/step has changed to a new stage/step based on the second real-time location of the first user device;

in response to determining the first stage/step has changed to the new stage/step, automatically change content displayed in the stage/step description section and the workflow feed section of the user interface on the first user device by:

looking up in the workflow database new stage/step description data corresponding to the new stage/step;

dynamically updating the stage/step description section of the user interface on the first user device via the network to display the new stage/step description data;

filtering a second new set of the activity feed posts stored in the activity feed post log in the workflow database based on the determined new stage/step by using a fifth set of keywords associated with the new stage/step and based on the second real-time location of the first user device by searching the activity feed post log for activity feed posts made at the second real-time location of the first user device; and creating and dynamically updating the workflow feed section of the user interface on the first user device via the network to display a second new activity feed, wherein the second new activity feed comprises the filtered second new set of the activity feed posts from the activity feed post log in the workflow database.

8. The method of claim 6, wherein configuring the new activity feed posts comprises embedding the determined second set of keywords related to the activity feed posts input into the activity feed posts input received from the first user device at the first real-time location, and wherein filtering the configured new activity feed posts comprises filtering the configured new activity feed posts based on the determined second set of keywords related to the activity feed posts input.

9. The method of claim 6, further comprising:

receiving data, from a second user device, indicative of one or more issues arising at a stage/step amongst a plurality of stages/steps that are part of the first workflow;

transmitting and posting the received data to a current activity feed in a workflow feed section of a user interface on a third user device via the network;

receiving feedback data from the third user device about the one or more issues; and selectively incorporating the feedback data into stage/step description data corresponding to the stage/step amongst the plurality of stages/steps that are part of the first workflow.

10. The method of claim 6, wherein filtering the configured new activity feed posts comprises applying different filters to the configured new activity feed posts for each of the other user devices of the plurality of user devices.

11. A product, comprising:

a non-transitory computer-readable medium comprising instructions that, when executed, cause a computer processor to:

receive activity feed posts from a plurality of user devices via a social network system and store the activity feed posts in an activity feed post log stored in a workflow database remote from the plurality of user devices, wherein the workflow database comprises workflow overview information and stage/step description data;

identify a first real-time location of a first user device based on a location data obtained by a first location identification system associated with the first user device, wherein the first location identification system is selected from the group consisting of a global positioning system, an IP address of the first user device, barcodes or QR codes scanned by the first user device, and near-field communication or Bluetooth protocols between the first user device and a nearby device;

identify a first workflow and a first stage/step associated with the first user device based on the identified first real-time location;

display first workflow overview information to a workflow overview section of a user interface on the first user device via a network;

display first stage/step description data to a stage/step description section of the user interface on the first user device via the network, wherein the stage/step description section of the user interface comprises a step completion button that a user can select when a particular step is completed;

filter a first set of the activity feed posts stored in the activity feed post log in the workflow database based on the identified first workflow and first stage/step by using a first set of keywords associated with the first workflow and the first stage/step and based on the identified first real-time location of the first user device by searching the activity feed post log for activity feed posts made at the first real-time location of the first user device;

create and display a first activity feed to a workflow feed section of the user interface on the first user device via the network, wherein the first activity feed comprises the filtered first set of the activity feed posts from the activity feed post log in the workflow database;

receive activity feed posts input from the first user device at the first real-time location, wherein the activity feed posts input is entered by the user in the workflow feed section of the user interface on the first user device;

determine a second set of keywords related to the activity feed posts input through querying the workflow database based on the first workflow, the first stage/step, and the first real-time location;

configure new activity feed posts by inserting additional information into the activity feed posts input through a server remote from the plurality of user devices, wherein the additional information comprises the determined second set of keywords related to the activity feed posts input;

determine other user devices of the plurality of user devices to which the configured new activity feed posts are to be sent by filtering the configured new activity feed posts based on a preset distance between the first real-time location and a real-time location of each of the other user devices of the plurality of user devices, wherein the real-time location of each of the other user devices is determined by a second location identification system associated with each of the other user devices, wherein the second location identification system is selected from the group consisting of a global positioning system, an IP address of each of the other user devices, barcodes or QR codes scanned by each of the other user devices, and near-field communication or Blue-tooth protocols between each of the other user devices and a nearby device;

transmit and display the filtered configured new activity feed posts to a current activity feed in a workflow feed section of a user interface of each of the determined other user devices of the plurality of user devices;

receive a selection of the step completion button by the user in the stage/step description section of the user interface on the first user device, thereby causing the computer processor to receive information indicating that the first stage/step is completed from the first user device;

in response to receiving information indicating that the first stage/step is completed, automatically change content displayed in the stage/step description section and the workflow feed section of the user interface on the first user device by:
looking up in the workflow database next stage/step description data corresponding to a next stage/step to the first stage/step;
dynamically updating the stage/step description section of the user interface on the first user device via the network to display the next stage/step description data;
filtering a next set of the previously submitted activity feed posts in the activity feed post log in the workflow database based on the next stage/step by using a third set of keywords associated with the next stage/step;
creating and dynamically updating the workflow feed section of the user interface on the first user device via the network to display a next activity feed, wherein the next activity feed comprises the filtered next set of the previously submitted activity feed posts from the activity feed post log in the workflow database;

track a second real-time location of the first user device based on the location data obtained by the first location identification system associated with the first user device;

determine that the first workflow has changed to a new workflow based on the second real-time location of the first user device;

in response to determining the first workflow has changed to the new workflow, automatically change content displayed in the workflow overview section and the workflow feed section of the user interface on the first user device by:
looking up in the workflow database new workflow overview information corresponding to the new workflow;
dynamically updating the workflow overview section of the user interface on the first user device via the network to display the new workflow overview information;
filtering a first new set of the activity feed posts stored in the activity feed post log in the workflow database based on the determined new workflow by using a fourth set of keywords associated with the new workflow and based on the second real-time location of the first user device by searching the activity feed post log for activity feed posts made at the second real-time location of the first user device; and creating and dynamically updating the workflow feed section of the user interface on the first user device via the network to display a first new activity feed, wherein the first new activity feed comprises the filtered first new set of the activity feed posts from the activity feed post log in the workflow database.

12. The product of claim 11, wherein the instructions, when executed, further cause the computer processor to:

determine that the first stage/step has changed to a new stage/step based on the second real-time location of the first user device;

in response to determining the first stage/step has changed to the new stage/step, automatically change content displayed in the stage/step description section and the workflow feed section of the user interface on the first user device by:

looking up in the workflow database new stage/step description data corresponding to the new stage/step;

dynamically updating the stage/step description section of the user interface on the first user device via the network to display the new stage/step description data;

filtering a second new set of the activity feed posts stored in the activity feed post log in the workflow database based on the determined new stage/step by using a fifth set of keywords associated with the new stage/step and based on the second real-time location of the first user device by searching the activity feed post log for activity feed posts made at the second real-time location of the first user device; and creating and dynamically updating the workflow feed section of the user interface on the first user device via the network to display a second new activity feed, wherein the second new activity feed comprises the filtered second new set of the activity feed posts from the activity feed post log in the workflow database.

13. The product of claim 11, wherein configuring the new activity feed posts comprises embedding the determined second set of keywords related to the activity feed posts input into the activity feed posts input received from the first user device at the first real-time location, and wherein filtering the configured new activity feed posts comprises filtering the configured new activity feed posts based on the determined second set of keywords related to the activity feed posts input.

14. The product of claim 11, wherein the instructions, when executed, further cause the processor to:

receive data, from a second user device, indicative of one or more issues arising at a stage/step amongst a plurality of stages/steps that are part of the first workflow;

transmit and post the received data to a current activity feed in a workflow feed section of a user interface on a third user device via the network;

receive feedback data from the third user device about the one or more issues;

and selectively incorporate the feedback data into stage/step description data corresponding to the stage/step amongst the plurality of stages/steps that are part of the first workflow.

15. A social collaboration workflow system, comprising:
a processor;
an interface communicatively coupled to a plurality of user devices via a network and communicatively coupled to a social network system via the network; and a memory in communication with the processor, the memory comprising a workflow database comprising workflow overview information, stage/step description data, an activity feed post log comprising previously submitted activity feed posts from users, and collaboration instructions that, when executed, cause the processor to:

identify a first real-time location of a first user device based on a location data obtained by a first location identification system associated with the first user device, wherein the first location identification system is selected from the group consisting of a global positioning system, an IP address of the first user device, barcodes or QR codes scanned by the first user device, and near-field communication or Bluetooth protocols between the first user device and a nearby device;

determine by the processor that a user of the first user device is working on an equipment component known to be at the identified first real-time location of the first user device;

identify a first workflow and a first stage/step corresponding to maintenance or repair of the equipment component;

display first workflow overview information to a workflow overview section of a user interface on the first user device via the network;

display first stage/step description data to a stage/step description section of the user interface on the first user device via the network, wherein the stage/step description section of the user interface comprises a step completion button that a user can select when a particular step is completed, wherein the first stage/step description data comprises diagrams of the equipment component subject to the first workflow for the first stage/step;

filter a first set of the previously submitted activity feed posts in the activity feed post log in the workflow database based on the determined equipment component by using a first set of keywords associated with the determined equipment component and based on the identified first real-time location of the first user device by searching the activity feed post log for activity feed posts made at the first real-time location of the first user device;

create and display a first activity feed to a workflow feed section of the user interface on the first user device via the network, wherein the first activity feed comprises the filtered first set of the previously submitted activity feed posts from the activity feed post log in the workflow database;

receive activity feed posts input from the first user device at the first real-time location, wherein the activity feed posts input is entered by the user in the workflow feed section of the user interface on the first user device;

determine a second set of keywords related to the activity feed posts input through querying the workflow database based on the first workflow, the first stage/step, the determined equipment component, and the first real-time location;

configure new activity feed posts by inserting additional information into the activity feed posts input through a server remote from the plurality of user devices, wherein the additional information comprises the determined second set of keywords related to the activity feed posts input;

determine other user devices of the plurality of user devices to which the configured new activity feed posts are to be sent by filtering the configured new activity feed posts based on a preset distance between the first real-time location and a real-time location of each of the other user devices of the plurality of user devices, wherein the real-time location of each of the other user devices is determined by a second location identification system associated with each of the other user devices, wherein the second location identification system is selected from the group consisting of a global positioning system, an IP address of each of the other user devices, barcodes or QR codes scanned by each of the other user devices, and near-field communication or Blue-tooth protocols between each of the other user devices and a nearby device;

transmit and display the filtered configured new activity feed posts to a current activity feed in a workflow feed section of a user interface of each of the determined other user devices of the plurality of user devices;

receive a selection of the step completion button by the user in the stage/step description section of the user interface on the first user device, thereby causing the social collaboration workflow system to receive information indicating that the first stage/step is completed from the first user device;

in response to receiving information indicating that the first stage/step is completed, automatically change content displayed in the stage/step description section and the workflow feed section of the user interface on the first user device by:
  looking up in the workflow database next stage/step description data corresponding to a next stage/step to the first stage/step;
  dynamically updating the stage/step description section of the user interface on the first user device via the network to display the next stage/step description data;
  filtering a next set of the previously submitted activity feed posts in the activity feed post log in the workflow database based on the next stage/step by using a third set of keywords associated with the next stage/step;
  creating and dynamically updating the workflow feed section of the user interface on the first user device via the network to display a next activity feed, wherein the next activity feed comprises the filtered next set of the previously submitted activity feed posts from the activity feed post log in the workflow database;

track a second real-time location of the first user device based on the location data obtained by the first location identification system associated with the first user device;

determine that the first workflow has changed to a new workflow based on the second real-time location of the first user device;

in response to determining the first workflow has changed to a new workflow, automatically change content displayed in the workflow overview section and the workflow feed section of the user interface on the first user device by:
  looking up in the workflow database new workflow overview information corresponding to the new workflow;
  dynamically updating the workflow overview section of the user interface on the first user device via the network to display the new workflow overview information;
  filtering a first new set of the previously submitted activity feed posts in the activity feed post log in the workflow database based on the determined new workflow by using a fourth set of keywords associated with the new workflow and based on the second real-time location of the first user device by searching the activity feed post log for activity feed posts made at the second real-time location of the first user device; and
  creating and dynamically updating the workflow feed section of the user interface on the first user device via the network to display a first new activity feed, wherein the first new activity feed comprises the filtered first new set of the previously submitted activity feed posts from the activity feed post log in the workflow database.

16. The social collaboration workflow system of claim 15, wherein the instructions, when executed, further cause the processor to:
  determine that the first stage/step has changed to a new stage/step based on the second real-time location of the first user device;
  in response to determining the first stage/step has changed to the new stage/step, automatically change content displayed in the stage/step description section and the workflow feed section of the user interface on the first user device by:
    looking up in the workflow database new stage/step description data corresponding to the new stage/step;
    dynamically updating the stage/step description section of the user interface on the first user device via the network to display the new stage/step description data;
    filtering a second new set of the previously submitted activity feed posts in the activity feed post log in the workflow database based on the determined new stage/step by using a fifth set of keywords associated with the new stage/step and based on the second real-time location of the first user device by searching the activity feed post log for posts made at the second real-time location of the first user device; and
    creating and dynamically updating the workflow feed section of the user interface on the first user device via the network to display a second new activity feed, wherein the second new activity feed comprises the filtered second new set of the previously submitted activity feed posts from the activity feed post log in the workflow database.

* * * * *